Patented Mar. 18, 1952

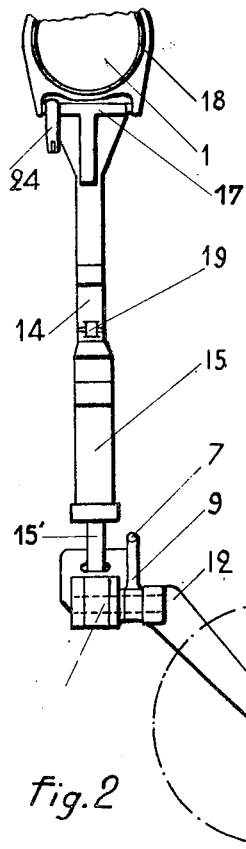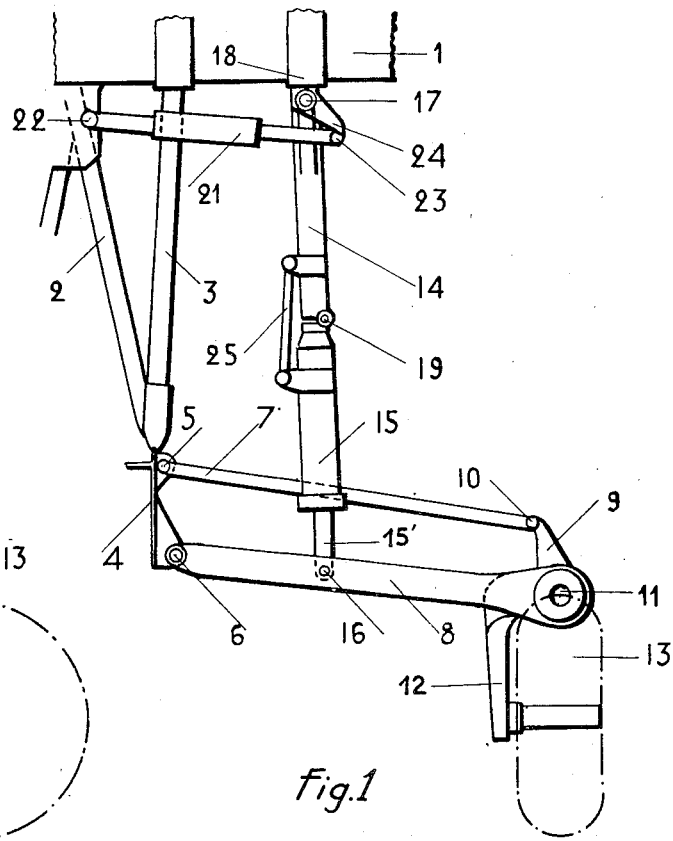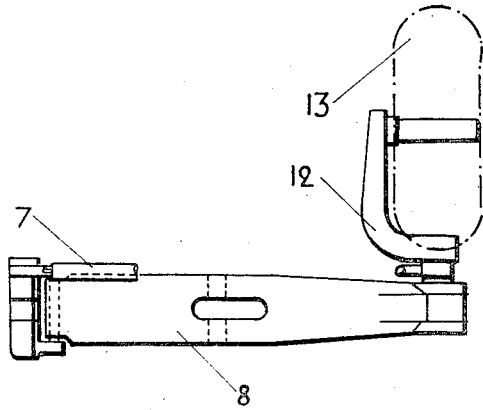

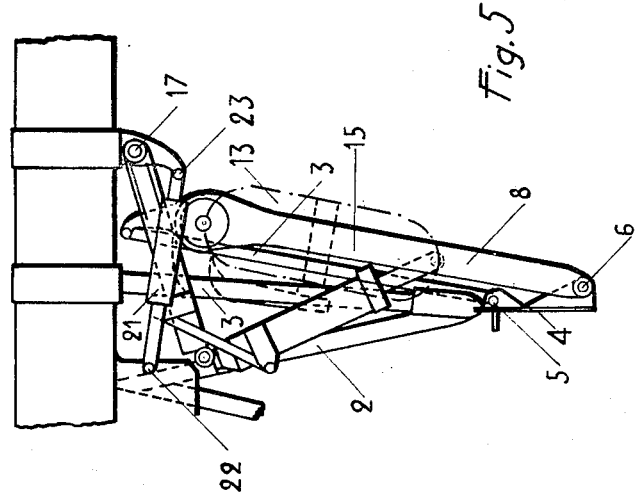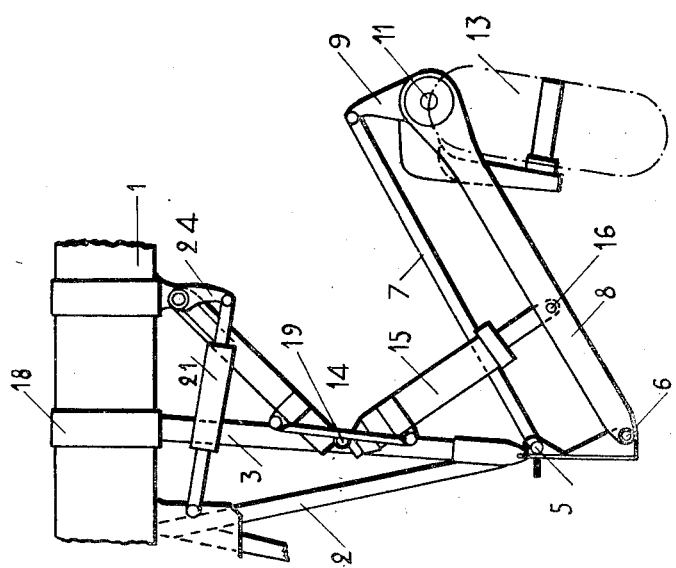

2,589,434

UNITED STATES PATENT OFFICE 2,589,434

RETRACTABLE LANDING GEAR FOR AIRCRAFT

Roger Aimé Robert, Boulogne-sur-Seine, France

Application December 15, 1945, Serial No. 635,308
In France April 3, 1943

Section 1, Public Law 690, August 8, 1946
Patent expires April 3, 1963

4 Claims. (Cl. 244—102)

1

This invention relates to retractable landing gears for aircrafts, and more specially to retractable landing gears in which a wheel or landing member is attached to the fixed part of an aircraft by means of an articulated parallelogrammatic system, the deformation of which brings the landing gear either into the retracted or into the extended position.

The object of this invention is to organize in such a way a retractable landing gear of this type that the bulk of the assembly formed by the articulated system and the wheel will be reduced to a minimum in retracted position.

According to said invention, the unit formed by the wheel or landing member and its support pivoted at one extremity of the deformable articulated system projects, in the extended position of the landing gear, either fore or aft of the transverse plane in which is located said system, so that, when pivoted during the retraction of the landing gear, the wheel will be brought into a plane substantially coextensive to the plane of the folded parallelogram either in front of or behind said parallelogram, in order to minimize the overall thickness of the gear assembly in said retracted position.

In order that my invention and the manner in which it is to be carried out may be properly understood, I have illustrated an embodiment thereof in the appended drawing, which is given merely as an example.

Fig. 1 is a front view showing the landing gear in its extended position;

Fig. 2 is a side view corresponding to Fig. 1;

Fig. 3 is a plan view certain parts being omitted for clarity, likewise corresponding to Fig. 1;

Fig. 4 is a front view in an intermediate position of the landing gear;

Fig. 5 is a front view showing the landing gear in its retracted position.

On a spar 1, forming part of the frame work of an aircraft wing, is fixed by means of two tubular members 2 and 3, a bracket 4 on which are pivoted as at 5 and 6, two arms 7 and 8. These latter are interconnected at their other ends 10, 11 by a connecting rod 9, rigid with a fork 12, pivoted likewise at 11 and carrying the wheel 13. Pivots 5, 10, 11 and 6 are the parallel vertices of a linked parallelogram, the fixed side of which is constituted by the line 5—6 of the bracket. The middle plane of wheel 13 passes approximately through the pivot pin 11 of fork 12, so that when taxiing and when the landing gear contacts the ground, the stress transmission will be realized in the best conditions. In the

2 landing position, wheel 13, as shown in Fig. 2, is at a certain distance behind the plane of the parallelogram 7, 8, 9 at least equal to the radius of the wheel. Obviously, the wheel could as well be offset forwards. In the extended position of the landing gear, the gear is immobilized by a strut 14 articulated as at 19 to a shock absorber 15. The piston 15' of the latter is pivoted at its outer end as at 16 to the lower arm 8 of the parallelogram. The strut 14 is pivoted as at 17 to a collar 18 mounted around the spar 1. The power means to retract the landing gear may be for example a hydraulic jack 21 pivoted on the one hand as at 22 to the fixed part of the aircraft and, on the other hand as at 23 to a crank 24, rigid with the strut 14 and rotating therewith on the pin 17. A resilient return means such as a spring 25 is inserted between the strut 14 and the shock absorber 15.

To retract the landing gear, the jack 21 is retracted; the strut 14 and shock absorber 15 are then folded about pivot 19 as shown in Figs. 4, 5, and the articulated parallelogrammatic system pivots about 5 and 6. During this pivoting motion, the wheel 13 is tilted relatively to the arms 7 and 8, since it is rigid with the fourth side 9 of this system. In the retracted position of the landing gear (Fig. 5), the wheel 13 reaches a position substantially coextensive with the plane of the parallelogram, which is now almost fully folded up and thus the overall thickness of the unit formed by the parallelogram and the wheel 13 is reduced to a minimum. Accordingly, the improved landing gear according to the invention may be located, when retracted, in a small space, a highly desirable feature for certain types of aircrafts. On the contrary, in the similar known type of landing gears, the overall thickness in retracted position is at least equal to the total amount of the thicknesses of the articulated parallelogram, on the one hand, and of the wheel, on the other hand.

Having now particularly described and ascertained the nature of my invention and in what manner the same is to be performed, I declare that what I claim is:

1. A retractable landing gear for aircraft of the type including a wheel maintained in a substantially vertical position during retraction, comprising a deformable parallelogram connected to the aircraft and transverse to the longitudinal axis thereof, means for retracting and extending the wheel by deforming said parallelogram, and a support connecting said wheel to said parallelogram, said support projecting from the parallelogram in a plane transverse thereto a distance at least equal to the radius of the wheel.

2. A retractable landing gear for aircraft of the type including a wheel maintained in a substantially vertical position during retraction, comprising a deformable parallelogram connected to the aircraft, a foldable strut pivoted intermediate the ends of one of the sides of said parallelogram for retracting and extending the wheel by deforming said parallelogram, and a support connecting said wheel to said parallelogram, said support projecting from the parallelogram in a plane transverse thereto, over a distance which, in a horizontal projection, is greater than the radius of the wheel.

3. Retractible aircraft landing gear comprising a foldable system extending transversely of the longitudinal direction of said aircraft, means for shifting said foldable system from a substantially horizontal position corresponding to an extended condition of said landing gear to a substantially vertical position corresponding with retraction of said gear and vice versa, supporting means carried by said foldable system and extending transversely thereto, a wheel carried by said supporting means and the axis of which is spaced further from said foldable system in a projection along said longitudinal direction than the radius of said wheel, and means for maintaining said wheel substantially vertical during said movements of the foldable system.

4. Retractible aircraft landing gear comprising a framework member of said aircraft, on said framework member two pivots parallel to the longitudinal axis of the aircraft and arranged one above the other, a first arm transverse to said axis and mounted at its inner end for rotation on one of said pivots, a second arm substantially equal in length to said first arm parallel thereto and mounted at its inner end for rotation on the other pivot, a link hinged at both its ends to the respective outer ends of both said arms and defining therewith and with the framework member a parallel linkage system, a wheel support rigid with said link and transverse to said system, a wheel rotatively carried on said support in a position spaced from said parallel linkage system by an amount greater in projection on a direction parallel to the pivots than the radius of said wheel, and means for shifting said parallel linkage system from a substantially horizontal to a substantially vertical condition and vice versa for the extension and the retraction of the landing gear.

ROGER AIMÉ ROBERT.

REFERENCES CITED

The following references are of record in the file of this patent:

UNITED STATES PATENTS

| Number | Name | Date |
|---|---|---|
| 1,166,488 | Smith | Jan. 4, 1916 |
| 1,859,624 | Grumman | May 24, 1932 |
| 2,021,439 | Wells | Nov. 19, 1935 |
| 2,157,963 | Mercier | May 9, 1939 |
| 2,184,260 | Sutton | Dec. 19, 1939 |
| 2,351,215 | Kleinhans et al. | June 13, 1944 |

FOREIGN PATENTS

| Number | Country | Date |
|---|---|---|
| 866,042 | France | Mar. 31, 1941 |